US005721581A

United States Patent [19]

Saito et al.

[11] Patent Number: 5,721,581

[45] Date of Patent: Feb. 24, 1998

[54] RECORDING APPARATUS

[75] Inventors: Atsushi Saito, Yokohama; Makoto Kobayashi, Tami; Akio Okubo, Tokyo; Junji Iguchi, Musashino; Keizo Sasai; Yasuyuki Shinada, both of Yokohama; Katsumi Obana, Funabashi; Yasuhiko Ikeda, Sagamihara; Yukio Nohata, Yokohama; Yuji Shimahara, Kawasaki; Shigeyuki Sugiyama, Yokohama; Noriyuki Aoki, Tokyo, all of Japan

[73] Assignee: Canon Kabushiki Kaisha, Tokyo, Japan

[21] Appl. No.: 346,295

[22] Filed: Nov. 23, 1994

[30] Foreign Application Priority Data

| | | | |
|---|---|---|---|
| Nov. 30, 1993 | [JP] | Japan | 5-299878 |
| Nov. 30, 1993 | [JP] | Japan | 5-299915 |

[51] Int. Cl.[6] .......... B41J 2/47; B41J 4/435; G11B 7/08

[52] U.S. Cl. .......... 347/249; 347/262; 347/264; 347/139

[58] Field of Search .......... 347/9, 56, 57, 347/65, 63, 209, 234, 248, 249, 262, 264, 139; 358/296

[56] References Cited

U.S. PATENT DOCUMENTS

| | | | |
|---|---|---|---|
| 4,313,124 | 1/1982 | Hara | 347/9 |
| 4,345,262 | 8/1982 | Shirato et al. | 347/57 |
| 4,459,600 | 7/1984 | Sato et al. | 347/65 |
| 4,463,359 | 7/1984 | Ayata et al. | 347/57 |
| 4,558,333 | 12/1985 | Sugitani et al. | 347/57 |
| 4,608,577 | 8/1986 | Hori | 347/209 |
| 4,723,129 | 2/1988 | Endo et al. | 347/63 |
| 4,740,796 | 4/1988 | Endo et al. | 347/56 |
| 4,868,674 | 9/1989 | Nakamura et al. | 358/296 |
| 5,291,222 | 3/1994 | Ohashi | 347/248 |

FOREIGN PATENT DOCUMENTS

| | | |
|---|---|---|
| 54-056874 | 5/1979 | Japan . |
| 59-123670 | 7/1984 | Japan . |
| 59-138461 | 8/1984 | Japan . |
| 60-071260 | 4/1985 | Japan . |
| 62-253457 | 11/1987 | Japan . |

*Primary Examiner*—Benjamin R. Fuller
*Assistant Examiner*—Raquel Yvette Gordon
*Attorney, Agent, or Firm*—Fitzpatrick, Cella, Harper & Scinto

[57] ABSTRACT

A facsimile apparatus comprises a facsimile unit for sending data corresponding to image data that has been received, and a printer unit for performing image recording by discharging ink droplets in accordance with data sent from the facsimile unit. A first CPU for the control of the facsimile unit sends, after one page of image data, data in a predetermined pattern and further a paper exhausting command to the printer. A second CPU of the printer unit performs a paper exhausting operation upon receiving the paper exhausting command, after recording of the predetermined pattern, and upon conveying the recording paper up to a predetermined position, sends a signal for starting detection of the predetermined pattern to the first CPU. The first CPU thereby receives a detection signal from a photo sensor. The second CPU further conveys the recording paper, and at a timing of exhausting out of the apparatus, sends a signal for the detection end of the predetermined pattern to the first CPU. Thereby, it is possible to detect correctly the pattern for detection of the emptiness of ink and the recording paper jam which is recorded at the trailing portion of the recording paper.

19 Claims, 11 Drawing Sheets

RECORDING APPARATUS

BACKGROUND OF THE INVENTION

1. Field of the Invention

The present invention relates to a recording apparatus for recording an image onto a recording medium in accordance with image data.

2. Related Background Art

Conventionally, as one of the recording apparatuses of this kind, an ink jet printer has been well-known which involves recording image data using a recording head having a plurality of nozzles for discharging ink droplets. This printer has the advantages of low running cost and quiet recording operation. In recent years, facsimile apparatuses utilizing such an ink jet printer as the recorder have appeared.

When the ink jet printer is employed as the recorder of facsimile apparatus, there is a risk that the ink may be used up during recording of received data, resulting in missing data. To resolve this, a facsimile apparatus has been proposed which involves recording a predetermined pattern (e.g., black mark) at a predetermined location in the trailing portion of recording paper after termination of recording one page of image data, reading the density of this pattern with an optical sensor, judging the presence or absence of the ink in accordance with a read result, and if the ink is empty, making switching to a memory acting reception.

However, in such apparatus, the detection of the presence or absence of the ink is administered by a main control unit which performs communication with the partner, and the transfer control of image data and a command to the recorder, this main control unit operating independently of the recording control unit for controlling the recording operation.

Hence, since if a print command for a predetermined pattern to be recorded for the detection of the presence or absence of the ink is sent, there is a delay before the practical recording, the main control unit was difficult to know the relative position between the predetermined pattern on the recording medium and the sensor. Therefore, in some instances, the main control unit may detect, through the sensor, the predetermined pattern off a predetermined position, misjudging the recording paper jam as the emptiness of ink or the emptiness of ink as the recording paper jam, and thereby preventing the user from making appropriate error processing.

Also, an ink jet recording apparatus may be configured in such a way that, because it takes some time for the ink to dry, the paper conveyance path from the recording area of the recording head to a paper ejecting stack is intentionally lengthened to allow for the ejection of the paper after the ink on the recording paper has dried. However, in this case, the recording paper just printed is not allowed to have the printed face carried between the rollers, liable to cause unstable conveyance, and it was common to provide a jam sensor for detecting whether the recording paper has passed entirely, to prevent possible failure, thereby raising the reliability in conveying the recording paper. With such a constitution, it follows that the recording paper exhausting unit of the apparatus has two sensors consisting of the black mark sensor and the jam sensor, as previously described.

However, with the above constitution, there was a drawback that, because two sensors are needed, the arrangement or apparatus constitution for the wiring becomes more complex, resulting in increased costs.

The black mark is not essentially image data needed by the user, and gave a different feeling in some instances from the viewpoint of beautiful sight of printed matter if it was singly present on the recording paper.

Further, the black mark is a simple solid black image, consuming a relatively great amount of ink even in a small space, and was a factor of increasing the running cost.

SUMMARY OF THE INVENTION

The present invention has been achieved in the light of the above-mentioned drawbacks, and its object is to provide an improved recording apparatus.

Further, it is another object of the present invention to provide a recording apparatus which is capable of detecting correctly a predetermined pattern to be recorded on the recording medium, after one page of image recording, to effect the appropriate processing.

Further, it is another object of the present invention to provide a recording apparatus which allows for the simplification of apparatus constitution to reduce the cost.

Further, it is another object of the present invention to provide a recording apparatus wherein a signal regarding the timing of detecting a predetermined pattern is output from control means for controlling the recording operation to control means for controlling detecting means for detecting a predetermined pattern.

Further, it is another object of the present invention to provide a recording apparatus comprising recording means for recording an image on a recording medium in accordance with image data, conveying means for conveying the recording medium from a recording position, first control means for controlling said recording means to record a predetermined pattern on the recording medium after one page of image recording, detecting means for detecting said predetermined pattern, and second control means for controlling said detecting means, wherein said first control means outputs a signal regarding the detection timing of said detecting means to said second control means, and said second control means causes the detection operation of said detecting means to be executed in accordance with said signal.

Further, it is another object of the present invention to provide a recording apparatus which can judge the presence or absence of the ink by detecting means detecting a predetermined pattern recorded at a predetermined position of the recording medium, as well as judging the abnormal conveyance of the recording medium by using same detecting means.

Further, it is another object of the present invention to provide an ink jet recording apparatus for recording an image on a recording medium, using a recording head which discharges ink droplets in accordance with image data, the ink jet recording apparatus comprising conveying means for conveying the recording medium, driving means for driving said recording head to record a predetermined pattern at a predetermined position of the recording medium to be conveyed by said conveying means, detecting means, provided downstream of the recording position with said recording head, for detecting the predetermined pattern recorded at the predetermined position of said recording medium, judging means for judging the presence or absence of ink in accordance with a detected result of said detecting means, and control means for judging the abnormal conveyance of the recording medium in accordance with a detected result of said detecting means and controlling the operation of said conveying means in accordance with a judged result.

The above and other objects of the present invention will be more apparent from the drawings and the following description.

DETAILED DESCRIPTION OF THE PREFERRED EMBODIMENTS

Figure 1:
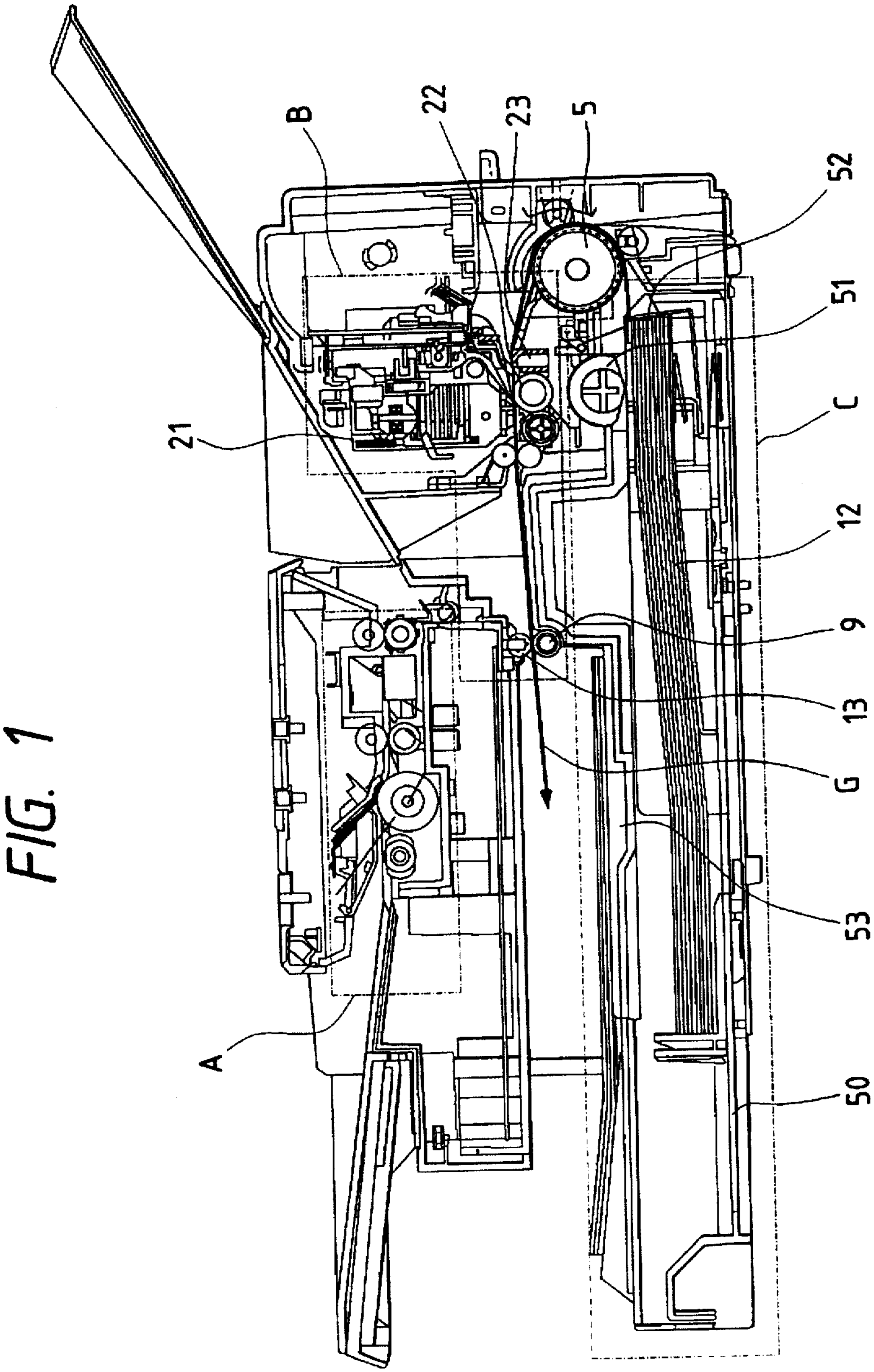
FIG. 1 is a cross-sectional view showing the schematic constitution of a facsimile apparatus to which the present invention is applied.

The preferred embodiments of the present invention will be described in detail with reference to the drawings. FIG. 1 is a cross-sectional view showing a facsimile apparatus to which the present invention is applied. In FIG. 1, A is a recording unit for reading optically the original, B is a recording unit which is an ink jet recording apparatus, and C is a paper supply unit for supplying separately a recording paper from a recording paper cassette which has recording papers stored therein.

In this figure, the flow of recording paper will be outlined. A series of recording paper conveyance paths is indicated by arrow G, a recording paper 12 loaded on the recording paper cassette 50 is first picked up by a paper supply roller 51 and a separation claw 52, and conveyed by a conveying roller 5 into the recording unit. In the recording unit, the recording head 21 is reciprocated in a direction perpendicular to the paper face for the main scan to effect the recording, the recording paper, after being conveyed a certain distance within the apparatus, being ejected into a paper ejecting stacker 53 by a paper ejecting roller 9 and stacked therein. On a shaft of the paper ejecting roller 9, a photo sensor 13 is disposed to sense the emptiness of ink in the recording head and recording paper jam near the paper ejecting roller.

Figure 2:
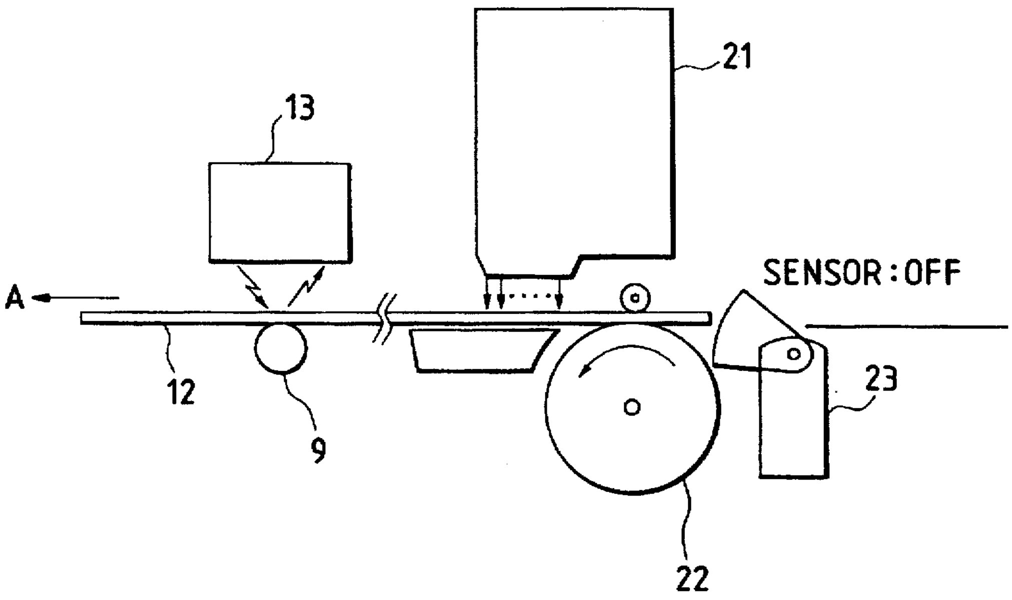
FIG. 2 is a view showing the constitution of a recorder unit of the facsimile apparatus as shown in FIG. 1.

FIG. 2 is a view showing the schematic constitution of a recorder unit B of the facsimile apparatus as shown in FIG. 1. In FIG. 2, 21 is a recording head, which is, in this embodiment, an ink jet recording head of the cartridge type of containing an ink tank and replaceable with a new recording head as a whole when the ink is emptied.

The recording head 21 used in this embodiment is a recording head of the ink jet system having a resolution of 360 dpi, with a column of 64 nozzles arranged in a sub-scan direction (a direction of the arrow A), whereby ink droplets are discharged through discharge orifices at the nozzle top end due to a pressure of film boiling caused in the ink by the heating of electricity-heat converters provided within nozzles.

The recording head 21 is reciprocated in a direction normal to the conveying direction (sub-scan direction) of the recording paper 12, namely, a main scan direction (a direction perpendicular to the paper face), by a carriage, not shown, to make the scan for recording in both forward and backward movement.

22 is a recording paper conveying roller, which can convey the recording paper at an accuracy of 360 dpi to make the positioning in a sub-scan direction, when supplying or ejecting the recording paper, and executing the recording with the recording head 21. 23 is a recording paper sensor, which is turned on if there is any recording paper in a sensing portion of this sensor, or otherwise turned off. This recording paper sensor 23 allows for the sensing of the presence or absence of the recording paper and the leading or trailing edge thereof. 13 is a reflection-type photo sensor for sensing the density of image on the recording face of the recording paper. In this embodiment, after one page of image recording, this sensor senses the image density of a predetermined pattern (black mark) recorded at the trailing portion of the recording paper, to check for the presence or absence of the ink or the conveyance failure of the recording paper from the sensed result. This photo sensor is comprised of an LED and a photo-transistor, which is turned off in the highly black portion such as a portion where image is recorded, because there is less reflecting light of LED, or otherwise turned on in the highly reflective portion such as a ground color of the recording paper. An LED light source must be selected in accordance with the material of the ink, because the ink has different absorbing wavelengths with the material of the ink. In this embodiment, a red LED is employed because the ink having a high absorptance to red wavelength is employed. Also, the photo sensor is located near a paper ejecting opening on the scheme, and unaffected by the external light. The paper ejecting roller 9 is made of rubber or the like, and when no recording paper is on the paper ejecting roller 9, the photo sensor 13 is turned off.

Figure 3:
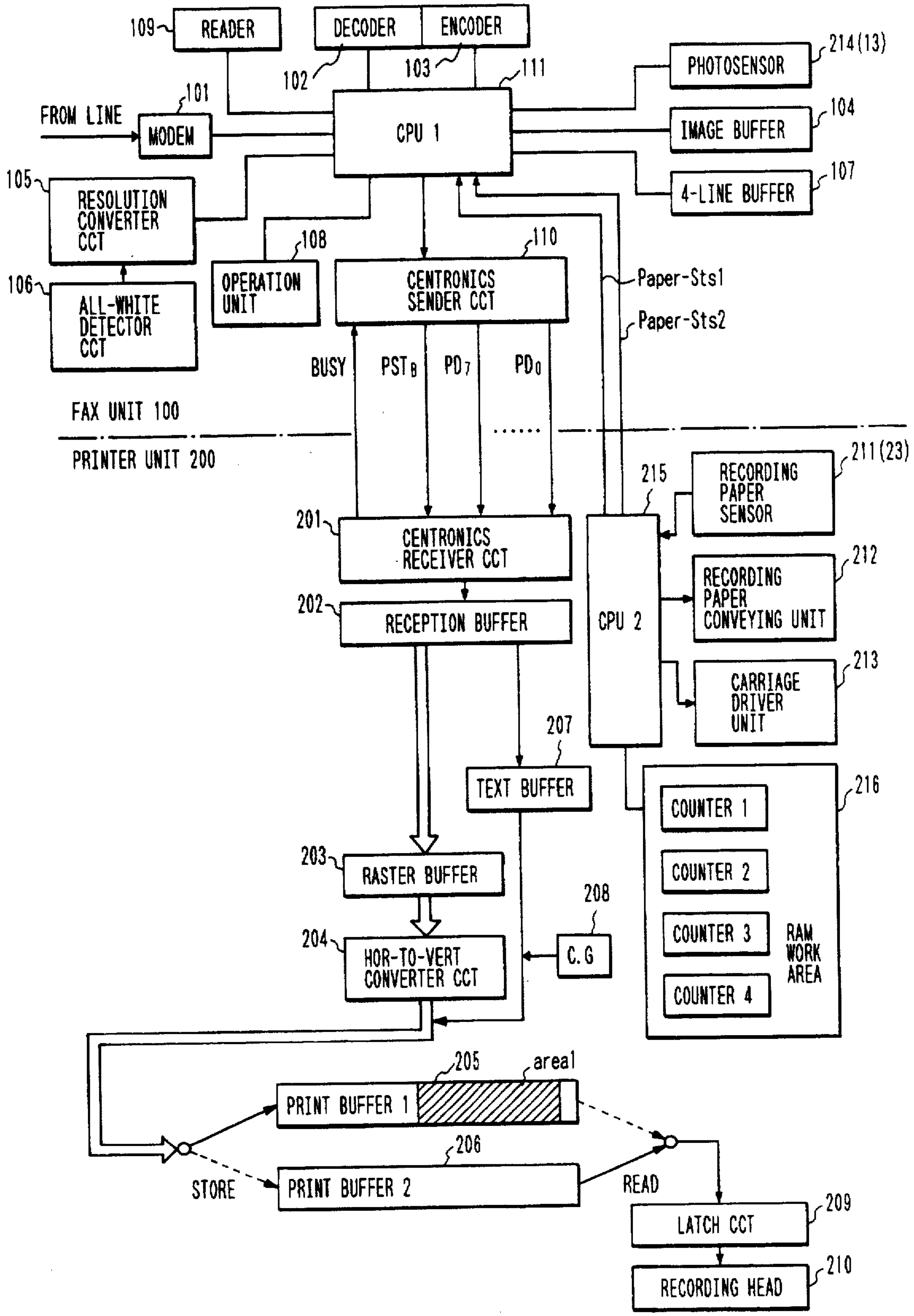
FIG. 3 is a block diagram showing the electrical configuration of the facsimile apparatus as shown in FIG. 1.

FIG. 3 is a block diagram representing the electrical configuration of the facsimile apparatus as shown in FIGS. 1 and 2, mainly regarding the flow of data. The facsimile apparatus in this embodiment is comprised of a facsimile unit 100 and a printer unit 200, the data transfer from the facsimile unit 100 to the printer unit 200 being made via a centronics interface. The facsimile unit 100 is first described below. In the figure, 101 is a modem serving for the transmission and reception of image data via the telephone line, 102 is a decoder for decoding received data, 103 is an encoder for encoding image data, 104 is an image buffer for storing image data, 105 is a resolution converter circuit for making resolution conversion of image data stored in the image buffer 104, 106 is an all-white detector circuit for detecting that data of one line is all white, and 107 is a 4-line buffer which can store line data of four lines converted in resolution by the resolution converter circuit 105, two lines used for the storage of data before conversion of resolution, and remaining two lines used for the storage of data after conversion of resolution. 108 is an operation unit (or console unit) having various function keys and indicators, 109 is a reader for reading the original image in sending and copying, 110 is a centronics sender circuit for sending line data stored in the 4-line buffer 107 to the printer unit 200, and 111 is a control unit (CPU1) for controlling the operation of the facsimile unit 100.

The printer unit 200 will be described below. 201 is a centronics reception circuit for receiving data sent from the centronics sender circuit 110, 202 is a receiver buffer for temporarily storing data received by the centronics reception circuit 201, 203 is a raster buffer for decoding data stored in the receiver buffer 202 through programmed processing and storing decoded line data, 204 is a horizontal-to-vertical converter circuit for converting line data stored in the raster buffer 203 to vertical data, and 205, 206 is a printer buffer for storing data output from the horizontal-to-vertical converter circuit 204, having a data storage capacity corresponding to the area to be recorded by a single main scan of the recording head.

207 is a text buffer for storing character code data to be sent by the facsimile unit 100 when outputting a communication management report, 208 is a character generator for converting character code stored within the text buffer 207 into dot image which is then sent to the print buffer 205 or 206, 209 is a latch circuit for latching data read from the print buffer 205 or 206, and 210 is a recording head for discharging ink droplets by being driven in accordance with data latched in the latch circuit 209 (corresponding to the recording head 21 as shown in FIGS. 1 and 2).

211 is a recording paper sensor for sensing the recording paper immediately before the recording position of the recording head (corresponding to the recording paper sensor 23 as shown in FIGS. 1 and 2), 212 is a recording paper conveying unit comprised of a pulse motor for generating the driving force for conveying rollers 5, 22 and paper ejecting roller 9, 213 is a carriage driver unit comprised of a pulse motor for generating the driving force to reciprocate the carriage with respect to the recording paper, 214 is a photosensor for sensing the black mark recorded at the trailing portion of the recording paper (corresponding to the photo sensor 13 as shown in FIGS. 1 and 2), and 215 is a control unit (CPU2) for controlling the data transfer processing of the printer unit 200 and the operation of load.

Data transfer from the facsimile unit 100 to the printer unit 200 is effected via signal lines $PD_0$ to $PD_7$ between the centronics sender circuit 110 and the centronics reception circuit 201 at the timings synchronous with the pulse signal generated in a signal line $PST_B$. This data transfer is enabled when a signal line BUSY is off. Also, a signal Paper_Sts1, Paper_Sts2 corresponding to the position of the recording paper as will be described later is output from the CPU2 of the printer unit 200 to the CPU1 of the facsimile unit 100. Also, the output of the photo sensor 214 is input into the CPU1 of the facsimile unit 100.

The operation will be now described. Received data is demodulated by the modem 101, decoded by the decoder 102 and expanded into dot image data, which is checked for a communication error. Thereafter, this dot image data is encoded again by the decoder 103, and stored in the image buffer 104. And encoded data stored in this image buffer 104 is read sequentially again, decoded through the programmed processing of the CPU1 (111), and expanded into dot image data of one line, which is stored in the 4-line buffer 107. This dot image data is sent to the resolution converter circuit 105 for the resolution conversion, and stored in remaining two lines of the 4-line buffer 107. Then, the all-white detector circuit 106 is operated to check to see if data of one line stored is all white. If so, it informs the CPU1 (111) that data is all white, whereby the CPU1 sends a command indicating that data of one line is all white to the centronics sender circuit 110, and then deletes the data of one line within the 4-line buffer 107 to prepare for the next data. If not, image data converted in resolution which exists within the 4-line buffer 107 is directly sent.

If data of at least one line is stored in the 4-line buffer 107, the CPU1 checks the BUSY signal, wherein if the BUSY signal is off, data converted in resolution and stored in the 4-line buffer 107 is sent via the centronics sender circuit 111 and the centronics reception circuit 201 to the receiver buffer 202. This BUSY signal is off if the receiver buffer 202 is empty. Accordingly, data transfer from the 4-line buffer 107 to the receiver buffer 202 is effected if the receiver buffer 202 is empty. Also, data transfer from the image buffer 104 to the 4-line buffer 107 is effected if there is an empty area of at least one line in the 4-line buffer 107.

This resolution conversion is performed to make the resolution of image data consistent with the recording resolution because the resolution of received image is different from the recording resolution (360 dpi×360 dpi).

Next, the flow of data in the printer unit 200 will be described. As previously described, data sent via the centronics interface from the facsimile unit 100 is temporarily stored in the receiver buffer 202 comprised of a RAM. Herein, data stored in the receiver buffer 202 is dot image data of one line converted into a desired resolution (360 dpi) by the resolution converter circuit 105 and a command. The CPU2 (215) checks the contents of the receiver buffer 202. For the image data, it is read from the receiver buffer 202 and transferred to the raster buffer 203. Also, for the command, its content is interpreted. If the command is a command indicating that data of one line is all white, data is not stored in a corresponding storage area of the raster buffer 203, but the next image data is stored in the storage area of the next line.

Herein, the raster buffer 203 is a memory having a capacity of 8 lines (8×3640 bits). If data of 8 lines is stored in this raster buffer 203, data from the leftmost end of the raster buffer 203 is sent in sequence to the horizontal-to-vertical converter circuit 204 for the horizontal-to-vertical conversion, and transferred to either the print buffer 1 (205) or the print buffer 2 (206). The print buffers 1, 2 are both memories having a storage capacity (64×3640 bits) corresponding to data amount recorded by a single scan of the recording head 21, one of them being used for the reading (recording) while the other is used for the storage of data for the next scan.

The CPU2 counts the number of horizontal-to-vertical conversions for data of 8 lines, if 8 counts are made, i.e., the horizontal-to-vertical conversion for data of 64 lines is ended, a print start signal is output, judging that data of one main scan is prepared, to start the movement of carriage, and the recording operation based on data stored in the print buffer 1 (205) or the print buffer 2 (206). And data is sent to the latch circuit 209 each 64 dots, whereby the discharge heaters of the recording head 210 are driven for the recording in accordance with data latched in the latch circuit 209. Meanwhile, the next main scan data is stored in the other print buffer.

The CPU2 predetects that the black data within the print buffer is stored from which address to which address, and if the data up to the final address has been transferred, ends the scan for recording, and switches the print buffer, so that the print buffer used for the data storage is made for the recording, and the print buffer used for the recording made for the data storage.

Next, the actual recording operation and the transfer timing of data from the receiver buffer 202 to the print buffer 205 or 206 will be described below. First, image data is transferred from the facsimile unit 100, its data being stored in the receiver buffer 202. The work area of a RAM 216 has set a counter 1 for counting the number of lines stored in the raster buffer 203, and every time the CPU2 stores data of one line in the raster buffer 203, increments the counter 1 and judges whether or not the count value of the counter 1 reaches 8. Data transfer from the receiver buffer 202 to the raster buffer 203 is continued until the count value of the counter 1 reaches 8. And upon the count value of the counter 1 reaching 8, data transfer from the receiver buffer 202 to the raster buffer 203 is interrupted, and further the horizontal-to-vertical conversion is made for data within the raster buffer 203 in sequence from the left end, its data being stored in the print buffer 1 (205). The work area of RAM has also set a counter 2 for counting the number of horizontal-to-veritcal conversions executed, whereby the CPU2 increments the counter 2 every time the horizontal-to-vertical conversion of data of 8 lines is executed, and judges whether or not the count value of the counter 2 reaches 8. Data transfer of 8 lines from the receiver buffer 202 to the raster buffer 203 and data transfer from the raster buffer 203 to the print buffer 1 (205) are repeated until the count value of the counter 2 reaches 8, namely, until the storage of data of 64 lines is ended. Herein, the counter 2 is only necessary to count a count value of at most 8, which is much simpler than counting the number of data for one main scan (64×3640).

If the count value of the counter 2 reaches 8, the CPU2 generates a recording start signal to effect the recording of data at the first scan stored in the print buffer 1. Herein, prior to the recording, the CPU2 predetects that the black data among data stored in the print buffer 1 (205) exists from which address in what width (see area 1 on FIG. 3), which data are stored in a predetermined region of RAM 216, wherein the print buffers 1, 2 have a relation that its address corresponds one-to-one to the position on the scan region performed by the recording head 20. Also, the position of the recording head 210 is judged, with reference to a home position, not shown, in accordance with the count value of a counter 4 for counting the number of pulses supplied to a carriage driving pulse motor of a carriage driver unit 213. That is, when moving in a direction away from the home position, the count value of the counter 4 for counting the number of pulses supplied to the carriage driving pulse motor is incremented, while when moving in a direction back to the home position, the count value of the counter 4 for counting the number of pulses supplied to the carriage driving pulse motor is decremented. Note that this counter 4 is also set in a predefined area of the RAM 216. With the count value, the current position of the recording head 210 can be detected.

After the recording start signal is issued, the recording head 210 is moved from the home position, and upon detection that it arrives at a position corresponding to first column position of the black data, data stored in the print buffer 1 is read each 64 dots in sequence from this position, and latched in the latch circuit 209, whereby the ink discharge heaters of the recording head 210 are driven in accordance with the latched data to effect the recording at the first scan. In a predetermined area of the RAM 216, a counter 3 capable of setting the number of columns corresponding to the width of black data is set, and decremented every time data is read from the first column position where black data exists to make the recording. This counting operation is also made by counting the number of pulse signals corresponding to pulses supplied to the carriage driving pulse motor. And if the count value of this counter 3 becomes 0, the recording head is stopped at that position, considering that the first scan is ended. And the recording paper conveying unit 212 is driven in accordance with the end of the first scan, and the paper conveying (sub-scan) is made by the distance corresponding to the recording width of the recording head 210.

Note that during the recording of data at the first scan, data at the second scan is transferred from the receiver buffer 202 to the print buffer 2 (206), like the data transfer at the first scan, and stored therein. Accordingly, if the data has been stored in the data print buffer 2 (206) at the second scan before the end of the first scan, the print buffer 2 (206) is switched for the reading of data and the print buffer 1 (205) for the storage of data at the end time of the first scan. And like the first scan, data is read from the print buffer 2 (206) to make the recording at the second scan, and the data at the third scan is stored in the print buffer 1 (205).

If data at the second scan is not stored in the print buffer 2 (206) at the time when the first scan ends, the recording head 210 waits for data at the second scan to be placed in the print buffer 2 at the print end position of the first scan. Also, if a preset time (e.g., 2 seconds) has passed on standby, the recording head 210 once returns to the home position. And if data at the second scan is all placed, the print buffer 2 (206) is switched for the reading of data, and the print buffer 1 (205) for the storage of data, whereby data is read from the print buffer 2 (206) to perform the recording at the second scan. Also, during the recording at the second scan, data at the third scan is stored in the print buffer 1 (205). And the paper is fed by the amount corresponding to the recording width of the recording head 210 upon the end of the second scan.

In this way, the print buffers 1, 2 are alternately switched for the data reading (recording) or the data storage, and by repeating the previous operation, the recording for image of one page can be made.

As previously described, the facsimile apparatus in this embodiment predetects that among data stored in the print buffer 1 (205) or 2 (206), the black data exists from which position in what width, and stored in the RAM 216.

Accordingly, after the end of the main scan, and in starting the next main scan, the recording end position at the current scan and the existing range of black data at the next scan are referenced to make the recording of the next scan at the print start position from which the carriage has a shorter travel from the recording end position. Therefore, the high speed printing can be realized without useless movement of the carriage.

However, in the cases where data contains a line extending over two consecutive main scans such as ruled line, the printing is controlled to be made in the same direction, irrespective of the recording end position and the printing range of the next main scan, because if the print direction is reversed every time of the main scan, the ruled line may be deviated.

Also, after the end of communication or when the output of a communication management report from the operation unit 108 is indicated by the user, the CPU1 sends communication management information in character data via the centronics interface to the printer unit 200. In this case, unlike the recording time of received data, the image buffer 104 and the 4-line buffer 107 are not used. In the printer unit 200, received character data is stored in the receiver buffer 202. Data stored in the receiver buffer 202 is read in sequence and analyzed, and then stored in the text buffer 207. Data character stored in the text buffer 207 is expanded into dot image by a character generator, and stored in the print buffer 1 (205) or 2 (206).

The subsequent recording operation is the same as the recording of received image.

The CPU2 of the printer unit 200 controls the recording head 21, the recording paper conveying unit 22 and the recording paper sensor 23 in accordance with an instruction of control command sent from the CPU1 of the facsimile apparatus 100.

Next, the black mark detection timing control in this embodiment will be described below. In the facsimile apparatus in this embodiment as above described, after the end of recording image data of one page, a predetermined pattern (black mark) is recorded at the position a predetermined margin apart from the rear edge in the trailing portion of the recording paper, the image density of this pattern is detected by the photo sensor 13, and the presence or absence of the ink and the conveyance failure of the recording paper are checked in accordance with the detected result. If the emptiness of ink is detected, the memory delayed reception is activated to store the received data following the current page in the image buffer 104. Also, if the conveyance failure is detected, a jam indication appears on the operation unit 108.

Figure 4:
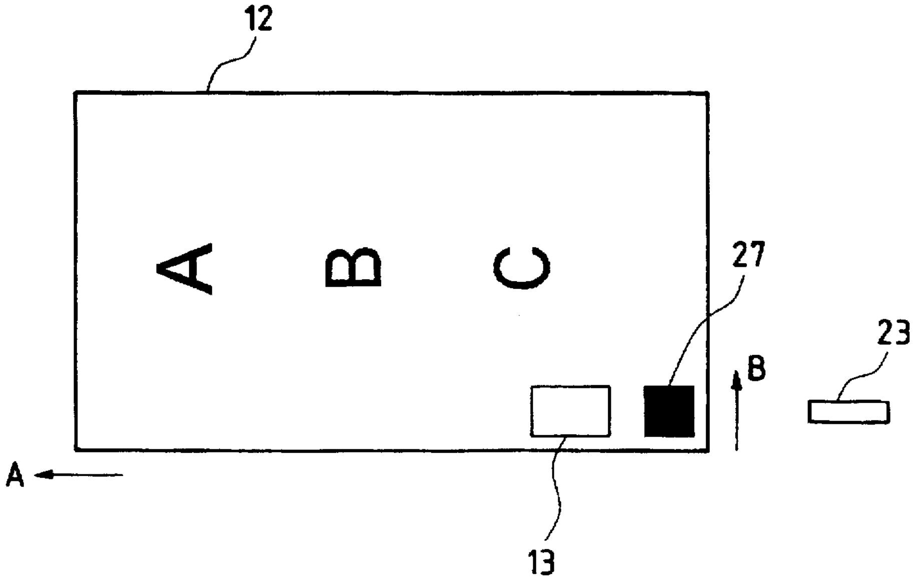
FIG. 4 is a view showing the positional relation between a recording paper sensor and a photosensor.

FIG. 4 shows the positional relation between the recording paper sensor 23 and the photo sensor 13. 27 indicates the black mark and its recording position. Herein, the sensors 23, 13 and the mark 27 are arranged on the straight line in a direction of conveying the recording paper (A direction or sub-scan direction). Also, they are located at the rearmost end in the recordable range of the recording head 21 upon the recording paper 26.

The output of this photo sensor 13 is input into the CPU1. This predetermined pattern is recorded by sending a print command from the CPU1 to the CPU2 of the printer unit 207, but the CPU1 has a delay from the sending of this print command to the practical recording, and it is difficult to know the relative position between the predetermined pattern and the photo sensor 13. Thus, in this embodiment, a signal corresponding to the conveyed position of the recording paper is output from the CPU2 of the printer unit 200 to the CPU1 to allow for the detection of the predetermined pattern at the correct timing.

Figure 5:
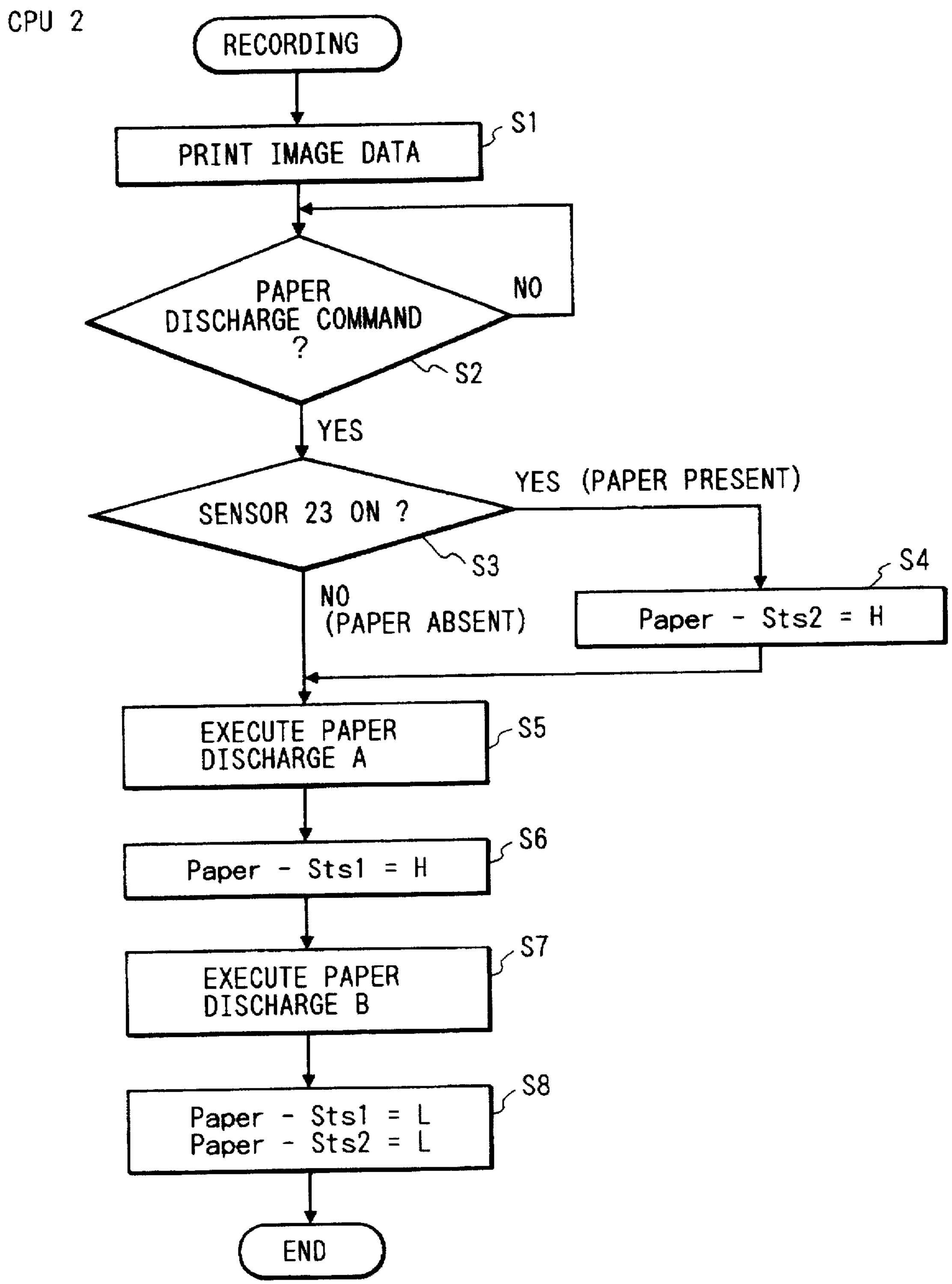
FIG. 5 is a flowchart for explaining a paper exhausting operation control for the recording paper with a control unit of the printer.

FIG. 5 is a flowchart showing the recording operation control of the CPU2 of the printer unit 200. First, at step S1, the CPU2 records data sent from the centronics sender circuit 110 as previously described. At the end of this image data, an image data of black mark 27 as shown in FIG. 4 is transferred to the CPU2, and recorded in the trailing portion of the recording paper, like image data. And at step S2, the CPU2 waits for a recording paper ejecting command to be sent from the centronics sender circuit 110. If the recording paper ejecting command is sent, the state of the recording paper sensor 23 is checked at step S3. Herein, if the recording paper sensor 23 is on (wherein recording paper is present), the conveyance failure of the recording paper may occur, preventing the normal recording of image, whereby the signal Paper_Sts2 to the CPU1 is set to H. If the recording paper sensor 23 is off (recording paper empty state) at step S3, the operation proceeds to step S5, with the signal Paper_Sts1 remaining at L, considering that the black mark 27 has been recorded at the regular position. At step S5, the paper ejecting operation is executed. In a paper ejecting operation A, the CPU2 performs the conveyance of the recording paper so that the black mark 27 recorded is placed about 10 mm before the photo sensor 13. If the paper ejecting operation A is ended, the signal Paper_Sts1 to the CPU1 is set to H at step S6, to prompt the CPU1 to start the detection of black mark. And the operation proceeds to step S7, with the Paper_Sts1 to the CPU1 remaining at H, to perform a paper ejecting operation B. In the paper ejecting operation B, a further paper ejecting operation is made so that the recording paper is ejected out of the apparatus. And if this paper ejecting operation B is ended, the operation proceeds to step S8 to set the signals Paper_Sts1 and Paper_Sts2 to L, and the end of the paper ejecting operation is informed to the CPU1.

Figure 6:
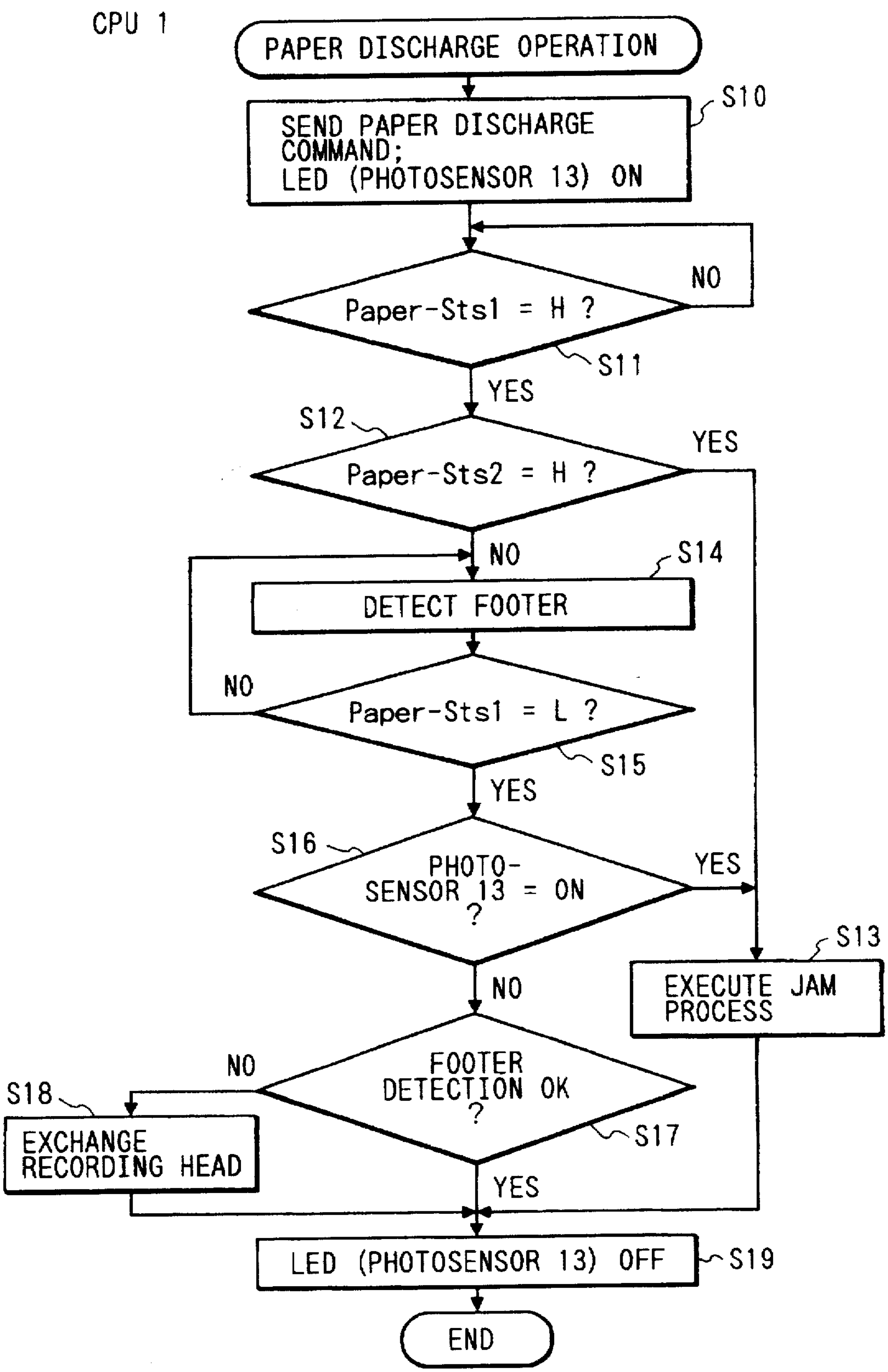
FIG. 6 is a flowchart for explaining a black mark detecting operation control with a control unit of the facsimile main device.

FIG. 6 is a flowchart showing the operation of the CPU1 of the facsimile unit 100 when the CPU2 performs the paper ejecting operation control of the recording paper.

First, at step S10, a paper ejecting command is sent via the centronics sender circuit 110 to the CPU2 of the printer unit 200. At the same time, LED of the photo sensor 13 is turned on. This paper ejecting command is sent from the CPU1 after image data of black mark 27 is sent. And at step S11, the operation waits for the black mark detection start signal Paper_Sts1 to become H. If this black mark detection start signal Paper_Sts1 becomes H, the operation proceeds to step S12 to check for the state of the signal Paper_Sts2 form the CPU2. Herein, if the Paper_Sts2 is H, the CPU2 determines the conveyance failure of the recording paper, and thus the CPU1 does not perform the detection of the black mark, whereby the operation proceeds to step S13 to execute the jam process of the recording paper. This recording paper jam process is a process of informing the user that the recording paper jam has occurred, specifically by indicating or warning by sound of the recording paper jam. At step S12, if the Paper_Sts2 is L, the operation proceeds to step S14 to start the detection of black mark. Herein, the detection of black mark is performed in such a manner as to detect the density at the position of black mark 27 in the recording paper with the photo sensor 13, while the recording paper is being ejected in the paper ejecting operation at step S7 of FIG. 5. The details for the detection of black mark will be described later with reference to FIG. 7. This detection with this photo sensor 13 is continued until the signal Paper_Sts1 becomes L at step S15, that is, the CPU2 terminates the paper ejecting operation of the recording paper as shown in FIG. 3. When the CPU2 terminates the paper ejecting operation, the state of the photo sensor 13 is checked at step S16. Herein, if the photo sensor 13 is on (recording paper present state), the recording paper is not yet exhausted though the CPU2 has terminated the paper ejecting operation. Hence, the operation proceeds to step S13 to execute the jam process for the recording paper, albeit the result of having detected the black mark at step S14. At step S16, if the output of the photo sensor 13 is L, the operation proceeds to step S17 to judge whether or not the detection of black mark at step S14 is normally performed. Herein, if the black mark is normally detected, the operation proceeds directly to step S19 to turn off the LED of the photo sensor 24 and then is ended. At step S17, if the black mark is not detected, the operation proceeds to step S18 to prompt the user to replace the recording head, since the ink is possibly used up with no recording. And the operation proceeds to step S19, where the LED of the photo sensor 13 is turned off and the recording operation is ended.

Figure 7:
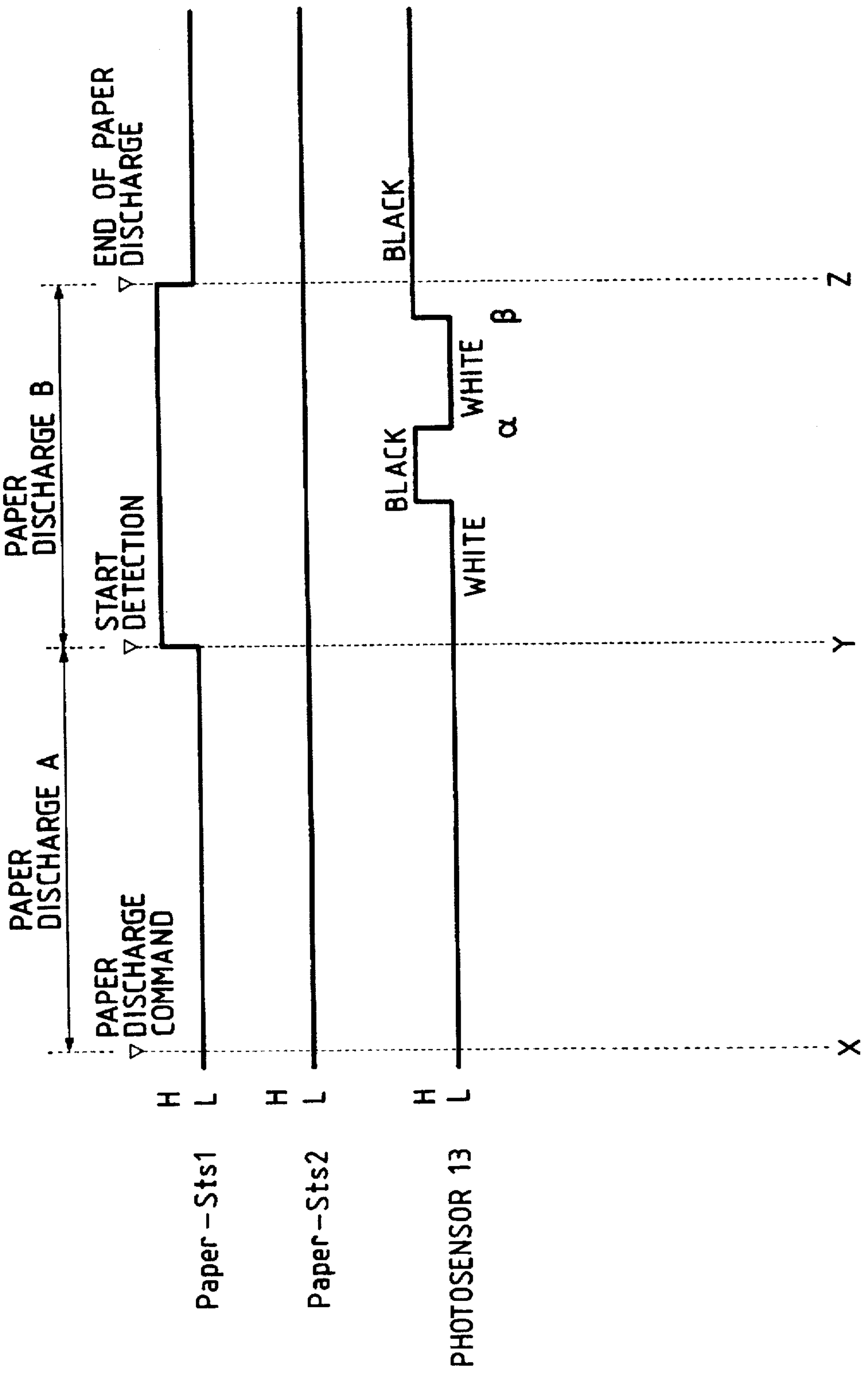
FIG. 7 is a timing chart when detecting the black mark.

FIG. 7 is a chart showing the timing of detecting the black mark.

When a paper ejecting command is received at step S2 of FIG. 5 (X point), the CPU2 performs the paper ejecting operation A. At the time when the recording paper is fed by the amount of (Y-X), the Paper_Sts1 is set to H, and the start of detecting the black mark 27 is instructed to the CPU1. Herein, the black mark 27 is situated about 10 mm before the photo sensor 13 in FIG. 6. After instructing the start of detecting the black mark at Y point, the CPU2 further performs the paper ejecting operation B. The black mark 27 passes by the photo sensor 13 in the (Z-Y), but if the black mark 27 has been normally recorded, the photo sensor 13 outputs a signal of L level while sensing the white paper portion before the black mark 27 in the interval of the paper ejection B, a signal of H level while sensing the black mark 27, and a signal of L level while sensing the margin in the trailing portion of the recording paper after the black mark 27. And after the recording paper has passed beneath the photo sensor 13, the photo sensor 13 outputs a signal of H level to sense the black of the paper ejecting roller 9. In this series of operations, the CPU1 detects the variation point from H to L (α point) or the variation point from L to H (β point) which is output from the photo sensor 13, while the Paper_Sts1 remains H, and confirms that the photo sensor 13 outputs the H level signal at the time when Paper_Sts1 becomes L (Z point). If these are sensed, it is determined that the recording is normally performed, without recording paper jam. If only the variation point from H to L (β point) is sensed, the emptiness of ink is determined, while if only the variation point from H to L (α point) is sensed, the recording paper jam is determined because the margin in the trailing portion of the recording paper has been sensed at the time of the termination of paper ejection (Z point). Also, if the output of the photo sensor 13 remains at H level in the interval of paper ejection B, the recording paper jam is determined, considering that the recording paper does not come to the paper ejecting roller 9, and the photo sensor 13 continues to sense the paper ejecting roller 9. Also, if the Paper_Sts2 is H in this interval of paper ejection B, the recording paper jam is determined as described with respect to FIG. 5.

In this embodiment, in addition to a normal mode of directly printing the input recording data, a mode referred to as a draft mode of thinning print data in accordance with a certain rule (period) may be provided. This is effective to save the consumption of the ink, shorten the recording period and enable the fast printing as no adjacent dots are discharged continuously, for example, by thinning dots in checked pattern.

When this draft mode is provided, only the black mark may be printed in this draft mode, irrespective of the print mode of image recording. On the contrary, to increase the detecting accuracy of footer mark, only the black mark may be printed in the normal mode to raise the printing density of the mark, even when the draft mode is designated for the image recording.

As above described, the recording control side grasps the position of the black mark for the detection of ink remaining, and the detection start signal is issued, whereby the ink remaining detection or the recording paper jam detection can be made more accurately.

Figure 8:
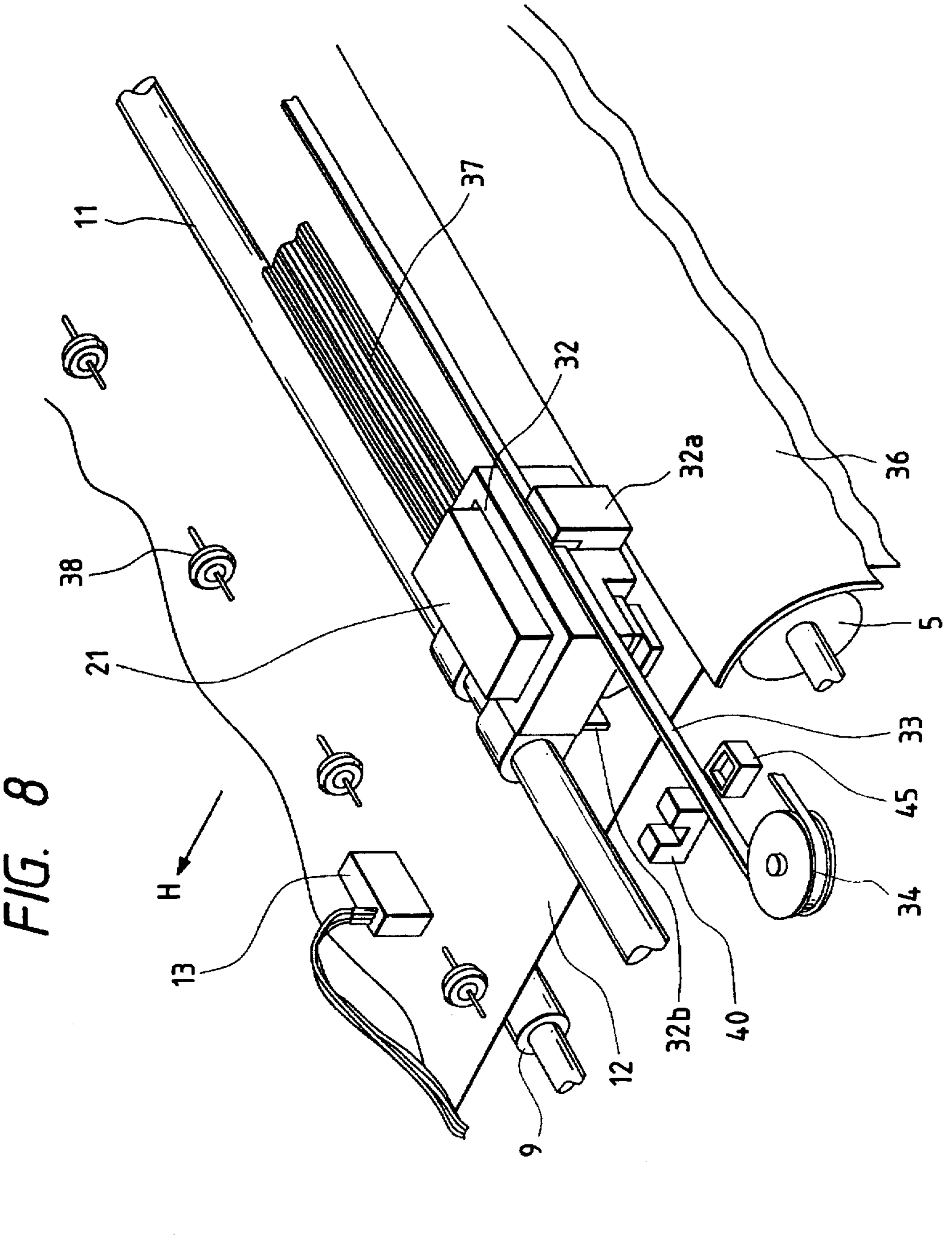
FIG. 8 is a perspective view showing the constitution of a recording unit.

Another embodiment of the present invention will be described below. A facsimile apparatus in this embodiment takes the constitution similar to that of the previous embodiment as shown in FIG. 1. FIG. 8 is a perspective view showing the details of the constitution of a recorder unit of this facsimile apparatus. In FIG. 8, 21 is a recording head, which is, in this embodiment, an ink jet recording head of the cartridge type of containing an ink tank and replaceable with a new recording head as a whole when the ink is used up.

The recording head 21 used in this embodiment is a recording head of the ink jet system having a resolution of 360 dpi, with 64 nozzles arranged, whereby the ink is discharged through discharge orifices at the nozzle top end due to a pressure of film boiling caused in the ink by the heating of electricity-heat converters provided within nozzles.

32 is a carriage for reciprocating the recording head 1 in a direction normal to the conveying direction (sub-scan direction) of the recording paper 12, namely, a main scan direction, while holding the recording head 12 at high precision, the carriage being carried slidably by a guide bar 11 and an abutment portion 32*a*. The reciprocating movement of this carriage 32 is performed by a pulley 34 which is driven by a carriage motor 132 as hereinafter described and a timing belt 33, in which the print signal and the electric power to be given to the recording head 1 are supplied via a flexible cable 37 from an electric circuit of the main device.

45 is a cap serving as ink accepting means, placed corresponding to the standby position (home position) of the carriage 32, moved up or down as required, wherein at the up position, the cap is placed into close contact with the recording head 21 to cover the nozzle portion to prevent the evaporation of the ink or attachment of the dirt.

In this embodiment, a carriage home sensor 40 provided on the recording apparatus main device and a light shielding plate 32*b* provided on the carriage 32 are used to position the recording head 21 and the cap 45 opposite to each other. The carriage home sensor 40 is a photo interrupter of the transmission type of sensing that the recording head 21 and the cap 45 are positioned opposite to each other, using the fact that when the carriage 32 is moved to a standby position, the light emitted from a part of the carriage home sensor 40 is prevented from passing therethrough by the light shielding plate 32*b*.

The recording paper 12 is supplied upward from the lower side in the figure, and conveyed in a direction as indicated by the arrow H (sub-scan direction), bent horizontally by a conveying roller 5 and a paper guide 36. The conveying roller 5 and the paper ejecting roller 9 are respectively driven by a drive system, not shown, to convey the recording paper 12 at high precision in a sub-scan direction, in connection with the reciprocating movement of the carriage 32, as required. 38 is referred to as a spur, made of a material having high water repellency, this spur being in contact with the recording paper 12 only at a blade-like circumferential portion thereof, and disposed a predetermined length apart by a bearing member, not shown, whereby the recording paper can be guided and conveyed without affecting the image even if there remains unfixed ink on the recording paper immediately after the printing. 13 is a photo sensor as in the previous embodiment, disposed on a shaft of the paper ejecting roller 9, which is a photo-interrupter of the reflection type of optically sensing whether or not there is a predetermined pattern (black mark) printed on the recording paper, thereby determining the emptiness of ink in the recording head or the recording paper jam from the output of black mark or the white output of the recording paper. The photo sensor used in this embodiment uses a red LED as the light emitting element and a photo-transistor as the light receiving element to determine whether the area having a diameter of 3 mm is white or black. Also, the paper ejecting roller 9 has a portion composed of a black rubber opposite to the photo sensor, so that the black output is provided when there is no recording paper.

Figure 9:
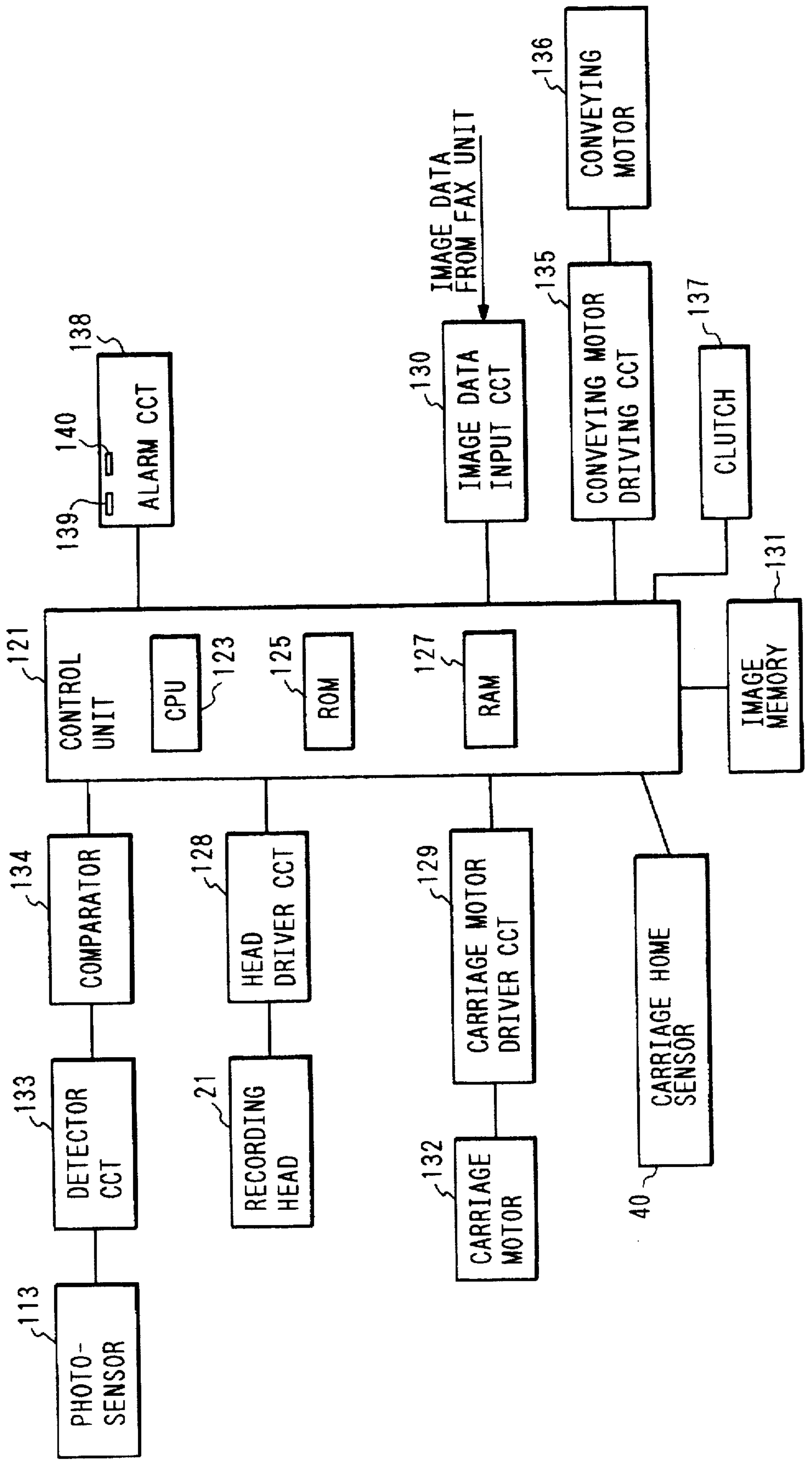
FIG. 9 is a block diagram showing an example of the configuration of a control system of an ink jet recording appratus according to another embodiment of the present invention.

FIG. 9 is a block diagram showing the schematic configuration of an electric circuit main portion of the facsimile apparatus in this embodiment. In FIG. 9, 121 is a control unit for controlling the whole of a recording apparatus, having a CPU 123 of a microprocessor, a ROM125 storing a control program of the CPU123 or various data, and a RAM127 usable as a work area for storing temporarily various data.

128 is a head driving circuit for discharging ink droplets by driving the recording head 21, 129 is a carriage motor driving circuit for driving a carriage motor 132 which is a driving source for reciprocating the carriage 32, 130 is an image data input circuit for inputting image data into a printer unit, which image data is sent via the line and received and demodulated by a facsimile unit B (not shown), 131 is an image memory for storing image data input from the image data input circuit 131, 133 is a sensing circuit for converting the output current of the photo sensor 113 into the voltage having a magnitude proportional thereto which is then output, 134 is a comparator for comparing the output voltage of the sensing circuit 133 with a predetermined threshold voltage to output the compared result to the control unit 121, 135 is a conveying motor driving circuit for driving a conveying motor 136 which is a driving source for the conveying roller 5 and the paper ejecting roller 9, 137 is a clutch for transmitting a driving force of the conveying motor 136 to the paper supply roller 51 for picking up the recording paper, and 138 is an alarm circuit having an indicator 139 which is lighted for indication when the emptiness of ink is detected and an indicator 140 which is lighted for indication when the recording paper jam is detected.

Figure 10:
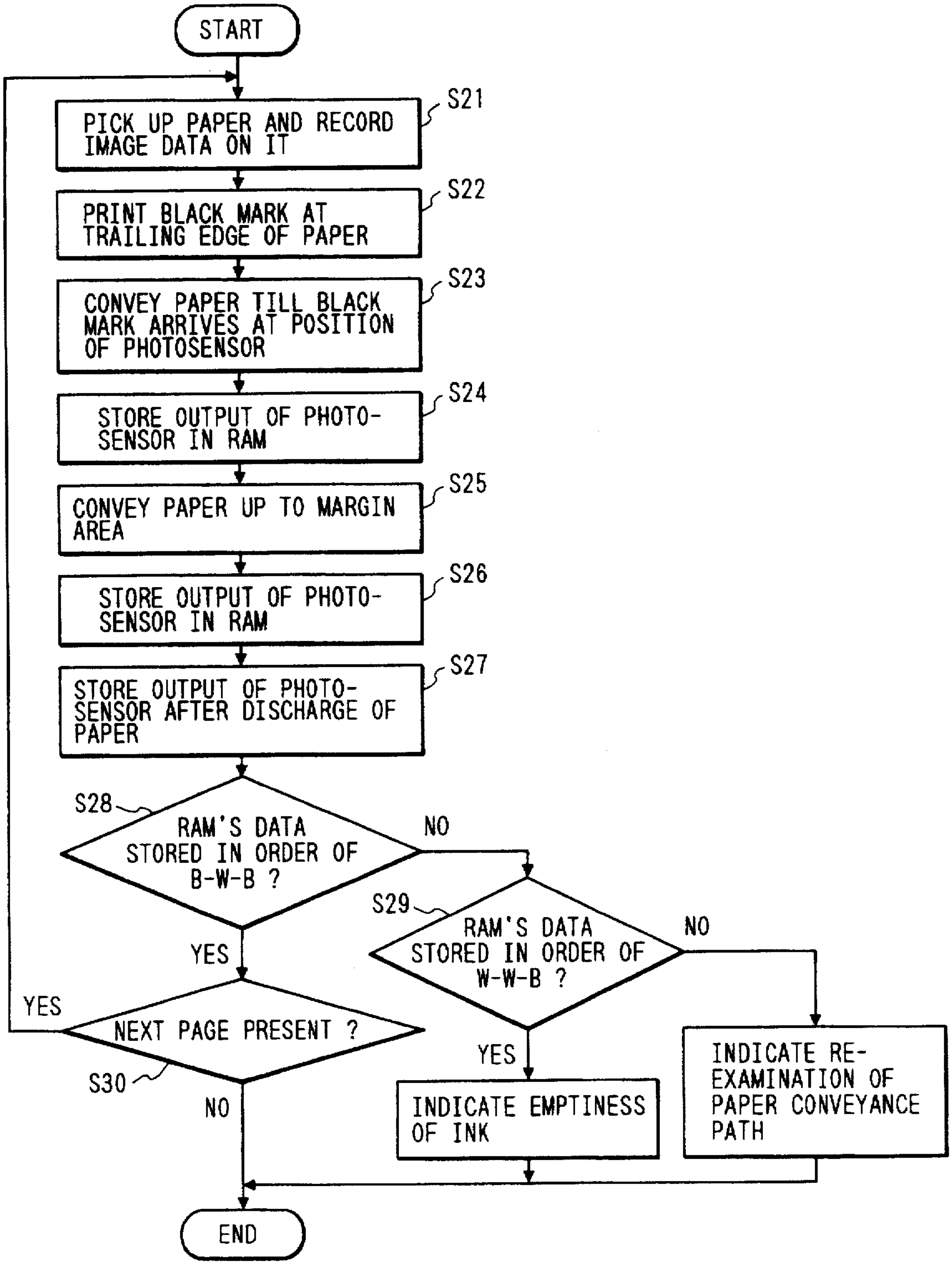
FIG. 10 is a flowchart showing a sequence of detecting emptiness of ink and recording paper jam.
Figure 11:
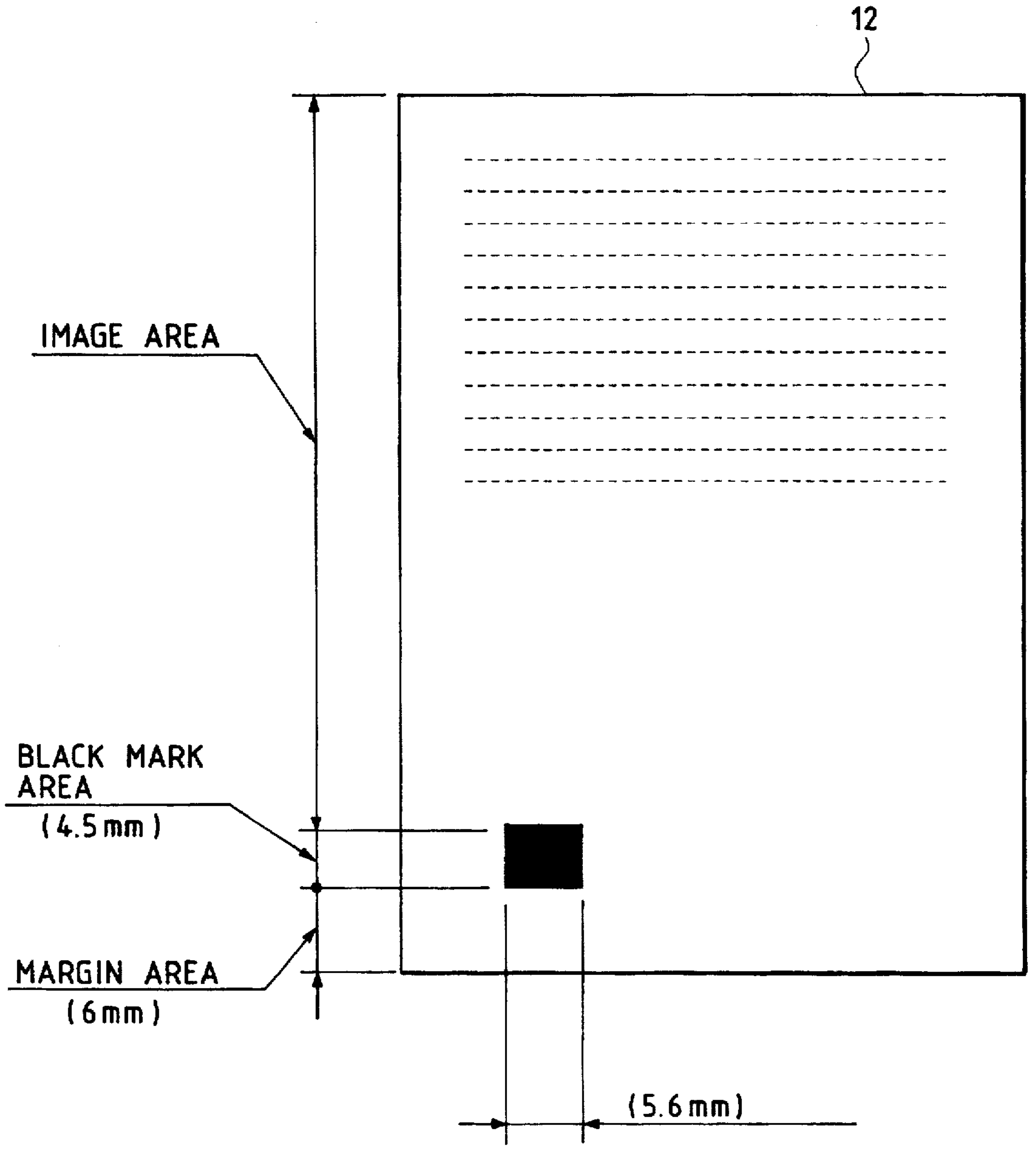
FIG. 11 is a view showing a shape example of black mark.

The sequence of detecting the emptiness of ink and the paper jam in this embodiment will be described below with reference to a flowchart of FIG. 10. A program according to this flowchart is stored in the ROM125, and the CPU123 makes the control in accordance with this program. First, the conveying motor 136 and the clutch 137 are operated. A recording paper is picked up, image data is read from the image memory 131, and an image of one page is recorded (step S21). A black mark is printed on the trailing portion of the recording paper (step S22). The black mark is printed in the form of a dot matrix in simple black solid, with a margin area for the judgement of white output of the recording paper provided with respect to the rear edge of the recording paper, as shown in FIG. 11. The recording paper is conveyed until the black mark comes to a position of the photo sensor 13 provided on the shaft of the paper ejecting roller 9 which corresponds to a last portion of the paper conveyance path (step S23). And at the timing when the black mark arrives at the position of the photo sensor 13, the output data (white or black) of the photo sensor 13 is stored via the sensing circuit 133 and the comparator 134 into the RAM127 (step S24). Then, the recording paper is conveyed until the margin area extending from the recording paper rear edge to the black mark comes to the position of the photo sensor 13 (step S25). And at the timing when the margin area arrives at the position of the photo sensor 13, the output data (white or black) of the photo sensor 13 in this portion is stored again into the RAM127 (step S26). Further, the recording paper is conveyed until it is stacked in an ejected paper stacker 53, and at the timing when the recording paper is ejected into the ejected paper stacker 53, the black surface of the paper ejecting roller 9 is read by the photo sensor 13, its output data being stored in the RAM127 (step S27). Thereafter, referring to the data of the RAM127, if the data is stored in the order of black, white and black, the normal completion of recording is determined (step S28). If a next page further exists, the clutch 137 is turned on to start the pick-up of the next paper, and the same operation is repeated (step S30). If no at step S28, and if the order is white, white and black, it is determined that the black mark can not be printed because of the emptiness of ink, whereby the indicator 139 is lighted to inform of the emptiness of ink, or otherwise it is determined that the recording paper is not normally conveyed to be jammed or stayed due to some reason, whereby the conveying motor 136 is controlled to stop the operation of the recording paper conveying unit, and the indicator 40 is lighted to inform that the recording paper conveyance path is inspected again (step S29). With the above, a series of recording operations can be completed, but owing to the provision of the photo sensor 13 at the last portion on the paper conveyance path which is located on the shaft of the paper ejecting roller 9, as previously described, the abnormal conveyance which may arise upstream thereof (i.e., on the entire paper conveyance path) can be sensed. Therefore, two functions of sensing the emptiness of ink and the paper jam can be implemented with only one photo sensor.

Figure 12:
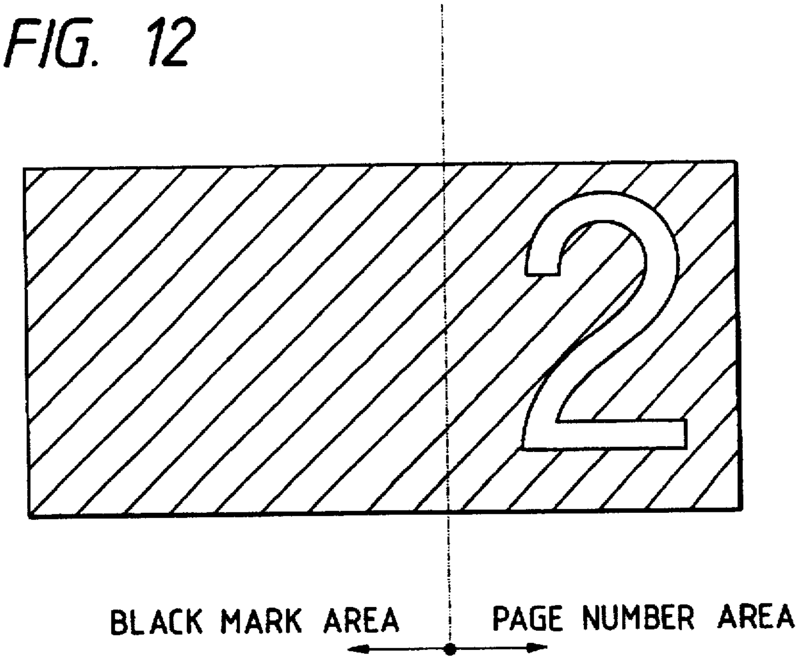
FIG. 12 is a view showing another shape example of black mark.

Note that the black mark in this embodiment is of a rectangular shape and in simple black solid as shown in FIG. 11, but when applied to the facsimile apparatus, it is convenient to have the pages of transmitted document printed, and the page number of document may be recorded with a void character in the black mark as shown in FIG. 12.

Also, to save the ink for printing the black mark, the black mark may be printed not in simple black solid but in a dot matrix pattern, thinned at, for example, 75%, 50%, etc. in staggered form, after correcting the threshold of the comparator 34.

As above described, due to the reasons that the black mark is printed outside the margin area from the rear edge of the recording paper, the photo sensor is disposed on the shaft of the paper ejecting roller, and the next recording paper is picked up after judging the output signal of the photo sensor, the ink empty sensor and the paper jam sensor can be integrated together, whereby the apparatus can be simplified with the lower cost and the higher reliability.

The addition of character information to the black mark is helpful for the user to have no sense of incompatibility, and the recording of black mark in dot matrix by thinning in staggered form can reduce the ink consumption and the running cost.

The discharge principle of the recording head used in the ink jet recording apparatus of this embodiment as recording means in the present invention will be described below. The recording head applied to the ink jet recording apparatus comprises typically fine liquid discharge openings (orifices), liquid channels and energy acting portions provided in part of the liquid channels, and energy generating means for generating liquid droplets forming energy acting on the liquid in the acting portions, and is replaceable.

Examples of energy generating means for generating such energy may include electromechanical converters such as piezo-electric elements, means of electromagnetic wave to apply an electromagnetic wave such as a laser to the liquid therein which is heated by absorbing such wave to discharge tiny liquid droplets under the action of heat, or electricity-heat converters for heating the liquid to discharge liquid droplets. Among them, the recording head of the ink jet recording system of discharging the liquid by heat energy allows the recording at high resolution to be realized, because liquid discharge openings (orifices) for forming flying liquid droplets by discharging liquid droplets for recording can be arranged at high density.

Also, the recording head using the electricity-heat converters as energy generating means can be made compact as a whole of the recording head, and take advantage of recent technical advances in the semiconductor fields, and the merits in the IC technologies or the micro-process technologies which have seen remarkable improvements in reliability, for the easy construction in long and planar (two dimensional) form, whereby it is possible to provide an ink jet recording head which can be easily made a multi-nozzle type and packaged at high density with higher mass productivity and lower manufacturing cost.

An ink jet recording head using the electricity-heat converters for the energy generating means, and manufactured through the semiconductor manufacturing process has a typical structure of providing liquid channels corresponding to ink discharge openings, and electricity-heat converters as means for applying heat energy to the liquid which is filled in each of liquid channels to discharge the liquid through corresponding ink discharge openings to form flying liquid droplets, thereby supplying the liquid from a common liquid chamber communicating to the liquid channels. The present applicant has applied a manufacturing method for the ink discharge portion, including laminating in sequence a solid layer for forming at least liquid channels on a first substrate, an active energy radiation curable material layer useful to form the walls of at least liquid channels, and a second substrate, laying a mask on the second substrate, directing active energy radiation from above the mask to cure, as the component, the walls of at least liquid channels of the active energy radiation curable material layer, and removing the solid layer and the uncured portion of the active energy radiation curable material layer from between two substrates, thereby forming at least liquid channels (see Japanese Laid-open Patent Application No. 62-253457).

Figure 13:
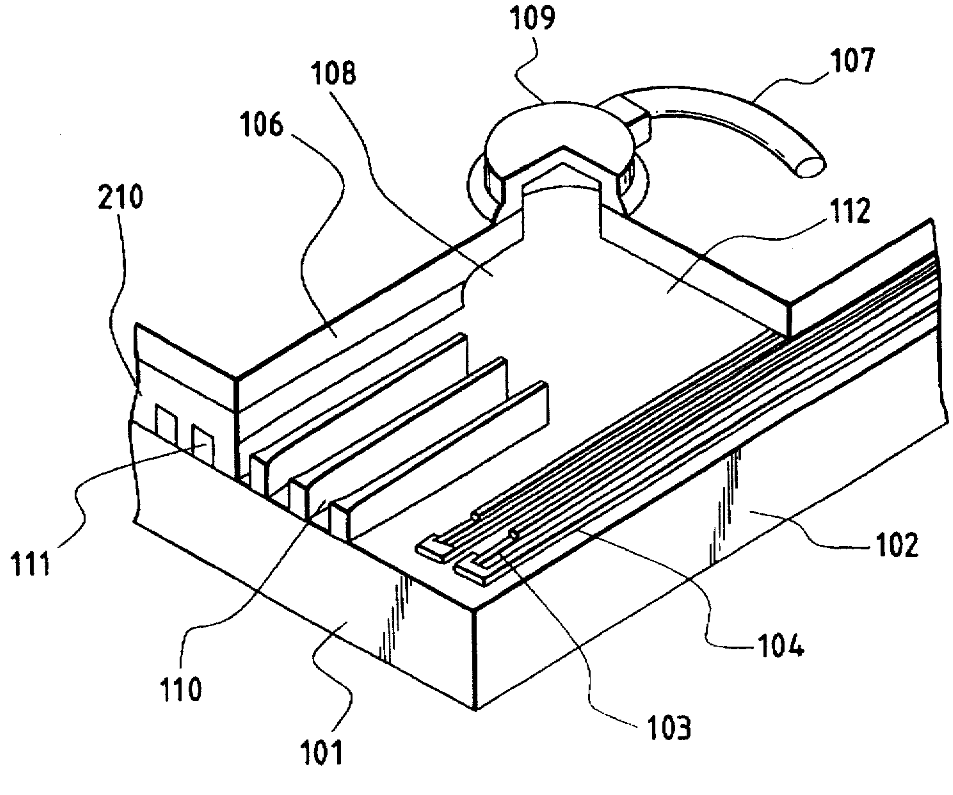
FIG. 13 is a perspective view showing the constitution of a recording head.

FIG. 13 is a schematic view of the ink jet recording head as above described. A recording head portion 101 is comprised of electricity-heat converters 103 formed as the film on the substrate 102 which is a first substrate, electrodes 104, an active energy radiation curable material layer 210 cured having liquid channels 110, and a ceiling plate 106, through the semiconductor manufacturing process including etching, evaporation and sputtering. However, in such recording head portion 101, the recording liquid 112 is supplied from a liquid reservoir, not shown, through a liquid supply tube 107 to the common liquid chamber 108.

109 is a connector for the liquid supply tube. The recording liquid 112 supplied to the common liquid chamber 108 is supplied into the liquid channels owing to capillary phenomenon, and stably held owing to the meniscus formed in ink discharge openings 111 at the top end of liquid channels. Thus, by conducting to the electricity-heat converters 103, the liquid on the surface of electricity-heat converters is heated, causing bubbling phenomenon due to film boiling, so that ink droplets are discharged through ink discharge openings 111 by the growth of bubbles. With the above constitution, it is possible to form an ink jet recording head of the multi-nozzle type with an arrangement of liquid channels at a high density, e.g., a discharge opening density of 360 to 400 dots/inch.

As to the representative constitution and principle of such ink jet recording method of forming flying liquid droplets using heat energy for the recording, for example, one practiced by use of the basic principle disclosed in, for example, U.S. Pat. Nos. 4,723,129 and 4,740,796 is preferred. This system is applicable to either of the so-called on-demand type and the continuous type. Particularly, the case of the on-demand type is effective because, by applying at least one driving signal which gives rapid temperature elevation exceeding nucleate boiling corresponding to the recording information on electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into the pulse shapes, growth and shrinkage of the bubbles can be effected instantly and adequately to accomplish more preferably discharging of the liquid (ink) particularly excellent in response characteristic.

As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. No. 4,558,333 or 4,459,600 disclosing the constitution having the heat acting portion arranged in the flexed region is also included in the present invention.

In addition, the present invention can be also effectively made the constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure waves of heat energy correspondent to the discharging portion.

In addition, the present invention is effective for a recording head of the freely exchangeable chip type which enables electrical connection to the main device or supply of ink from the main device by being mounted on the main device, or a recording head of the cartridge type having an ink tank integrally provided on the recording head itself.

Also, addition of a recovery means for the recording head, a preliminary auxiliary means, etc., provided for the recording head is preferable, because the effect of the present invention can be further stabilized. Specific examples of these may include, for the recording head, capping means, cleaning means, pressurization or suction means, electricity-heat converters or another type of heating elements, or preliminary heating means according to a combination of these, and it is also effective for performing stable recording to perform preliminary discharge mode which performs discharging separate from recording.

Further, as the recording mode of the recording device, the present invention is extremely effective for not only the recording mode only of a primary color such as black, etc., but also a device equipped with at least one of plural different colors or full color by color mixing, whether the recording head may be either integrally constituted or combined in plural number.

Though being ink is considered as the liquid in the embodiments as above described, another ink may be also usable which is solid below room temperature and will soften or liquefy at or above room temperature, or liquefy when a recording signal used is issued.

In addition, in order to avoid the temperature elevation due to heat energy by positively utilizing the heat energy as the energy for the change of state from solid to liquid, or to prevent the evaporation of ink by using the ink which will stiffen in the shelf state, the use of the ink having a property of liquefying only with the application of heat energy, such as those liquefying with the application of heat energy in accordance with a recording signal so that liquid ink is discharged, or may be solidified at the time of arriving at the recording medium, is also applicable in the present invention. In such a case, the ink may be held as liquid or solid in recesses or through holes of a porous sheet, which is placed opposed to electricity-heat converters, as described in Japanese Laid-Open Patent Application No. 54-56847 or No. 60-71260.

Furthermore, a recording apparatus according to the present invention may be used as an image output terminal in an information processing equipment such as a computer, a copying machine in combination with a reader, in addition to the facsimile apparatus as above described.

Also, the present invention is not limited to discharging ink droplets using the heat energy, but may be applicable to discharging ink droplets using piezoelectric elements.

What is claimed is:

1. A recording apparatus comprising:

recording means for recording an image on a recording medium in accordance with image data at a recording position;

conveying means for conveying the recording medium from the recording position;

first control means for controlling said recording means to record a predetermined pattern on a trailing portion of the recording medium after one page of image recording, said first control means further controlling said conveying means;

detecting means for detecting said predetermined pattern downstream of the recording position with respect to a conveyance direction of the recording medium; and second control means for controlling said detecting means, wherein said first control means outputs a signal concerning detection timing of said detecting means to said second control means in accordance with a conveyance state of the recording medium from the recording position by said conveying means, and said second control means causes a detection operation of said detecting means to be executed in accordance with the signal.

2. A recording apparatus according to claim 1, further comprising recording medium detecting means for detecting the recording medium upstream of the recording position of said recording means with respect to the conveyance direction of the recording medium with said conveying means and sending an output to said first control means, wherein said first control means outputs a signal concerning the detection timing to said second control means in accordance with the output of said recording medium detecting means.

3. A recording apparatus according to claim 1, wherein said recording means records the image by discharging ink as droplets in accordance with the image data.

4. A recording apparatus according to claim 3, wherein said second control means determines whether or not the ink is present based on a detected result of said detecting means.

5. A recording apparatus according to claim 4, wherein said second control means further determines whether or not the recording medium is conveyed improperly in accordance with a detected result of said detecting means.

6. A recording apparatus according to claim 1, further comprising receiving means for receiving the image data through a line, wherein said recording means records the image on the recording medium in accordance with the image data received by said receiving means.

7. A recording apparatus according to claim 2 or 6, wherein said recording means records the image on the recording medium by discharging ink droplets in accordance with the image data.

8. A recording apparatus according to claim 6, wherein said recording means discharges ink droplets by causing state changes in ink using heat energy.

9. A recording apparatus for recording an image on a recording medium using a recording head which discharges ink as droplets in accordance with image data at a recording position, said apparatus comprising:

driving means for driving the recording head to record a predetermined pattern at a predetermined position of the recording medium, the predetermined position being apart from a trailing edge of the recording medium by a predetermined margin;

conveying means for conveying the recording medium from the recording position;

detecting means, provided downstream of the recording position of the recording head, for detecting the predetermined pattern recorded at the predetermined position of the recording medium;

judging means for judging whether the ink is present or not in accordance with output states of said detecting means at a first timing when the predetermined pattern is present at a detection position of said detecting means, at a second timing when the predetermined margin is present, and at third timing when the recording medium passes the detection position; and control means for judging a conveyance state of the recording medium in accordance with output states of said detecting means at the first, second and third timings, and controlling an operation of said conveying means in accordance with a result of judgement.

10. A recording apparatus according to claim 9, wherein the predetermined pattern is recorded at a position on a trailing portion of the recording medium.

11. A recording apparatus according to claim 10, wherein a black member is provided at an opposite position to said detecting means, and said judging means judges whether or not the ink is present based on first data obtained corresponding to the predetermined pattern, second data obtained corresponding to the predetermined margin, and third data obtained corresponding to said black member.

12. A recording apparatus according to claim 11, wherein said control means controls the operation of said conveying means based on the first data, the second data and the third data.

13. A recording apparatus according to claim 12, wherein said control means controls said conveying means to feed the recording medium when the first data, the second data and the third data are proper.

14. A recording apparatus according to claim 12 or 13, further comprising informing means for informing of an abnormal conveyance of the recording medium, wherein said control means operates said informing means when the first data, the second data and the third data are not proper.

15. A recording apparatus according to claim 9, wherein character information is added to the predetermined pattern.

16. A recording apparatus according to claim 9, wherein the predetermined pattern comprises a dot matrix pattern thinned in staggered form.

17. A recording apparatus according to claim 9, wherein the recording head discharges the ink as droplets in accordance with the image data sent through a line.

18. A recording apparatus according to any one of claims 9 to 13 and 15 to 17, wherein the recording head discharges the ink as droplets through discharge openings by causing state changes in the ink using heat energy.

19. A recording apparatus according to claim 14, wherein the recording head discharges the ink as droplets through discharge openings by causing state changes in the ink using heat energy.

* * * * *